(12) United States Patent
Ohtomo et al.

(10) Patent No.: US 10,101,441 B2
(45) Date of Patent: Oct. 16, 2018

(54) ELECTRO-OPTICAL DISTANCE METER

(71) Applicant: Kabushiki Kaisha TOPCON, Tokyo-to (JP)

(72) Inventors: Fumio Ohtomo, Saitama (JP); Kaoru Kumagai, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 311 days.

(21) Appl. No.: 15/051,706

(22) Filed: Feb. 24, 2016

(65) Prior Publication Data

US 2016/0259039 A1    Sep. 8, 2016

(30) Foreign Application Priority Data

Mar. 2, 2015 (JP) .................................. 2015-040504

(51) Int. Cl.
| | |
|---|---|
| G01C 3/08 | (2006.01) |
| G01S 7/486 | (2006.01) |
| G01S 17/10 | (2006.01) |
| G01S 17/36 | (2006.01) |
| G01S 7/491 | (2006.01) |
| G01S 7/497 | (2006.01) |

(52) U.S. Cl.
CPC ............ *G01S 7/4865* (2013.01); *G01S 7/497* (2013.01); *G01S 7/4915* (2013.01); *G01S 17/102* (2013.01); *G01S 17/36* (2013.01)

(58) Field of Classification Search
CPC .... G01S 17/325; G01S 7/4915; G01S 17/102; G01S 17/36; G01S 7/497
See application file for complete search history.

(56) References Cited

U.S. PATENT DOCUMENTS

| 4,413,904 A | 11/1983 | Hamada et al. |
| 2004/0145723 A1 | 7/2004 | Ohtomo |
| 2016/0266254 A1 | 9/2016 | Ohtomo et al. |

FOREIGN PATENT DOCUMENTS

| DE | 4303804 A1 | 8/1994 |
| GB | 2336493 A | 10/1999 |
| JP | 5-232232 A | 9/1993 |
| JP | 2004-219285 A | 8/2004 |

OTHER PUBLICATIONS

European communication dated Aug. 1, 2016 in corresponding European patent application No. 16157707.7.
European communication dated Aug. 5, 2016 in co-pending European patent application No. 16157710.1.
Office action dated Mar. 6, 2018 in co-pending U.S. Appl. No. 15/051,708.
Notice of allowance dated Jul. 5, 2018 in co-pending U.S. Appl. No. 15/051,708.

*Primary Examiner* — Samantha K Abraham
(74) *Attorney, Agent, or Firm* — Nields, Lemack & Frame, LLC

(57) ABSTRACT

The invention relates to an electro-optical distance meter, which projects a modulated measuring light to an object to be measured, receives a reflected measuring light from the object to be measured and measures a distance to the object to be measured by a phase difference between the measuring light and the reflected light. With the electro-optical distance meter, it is possible to efficiently prepare signals required for measurement and to perform measurement within a short time.

6 Claims, 4 Drawing Sheets

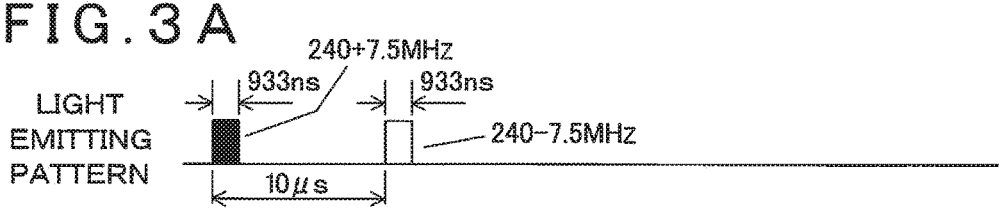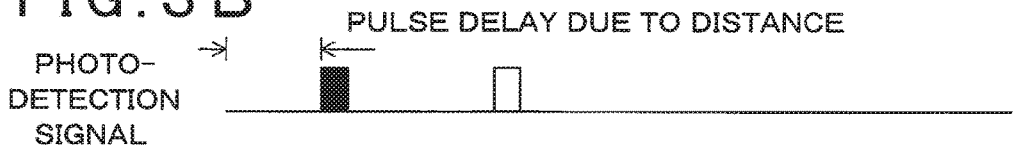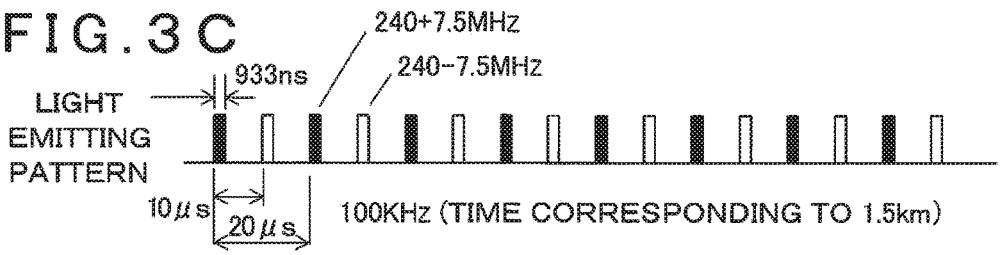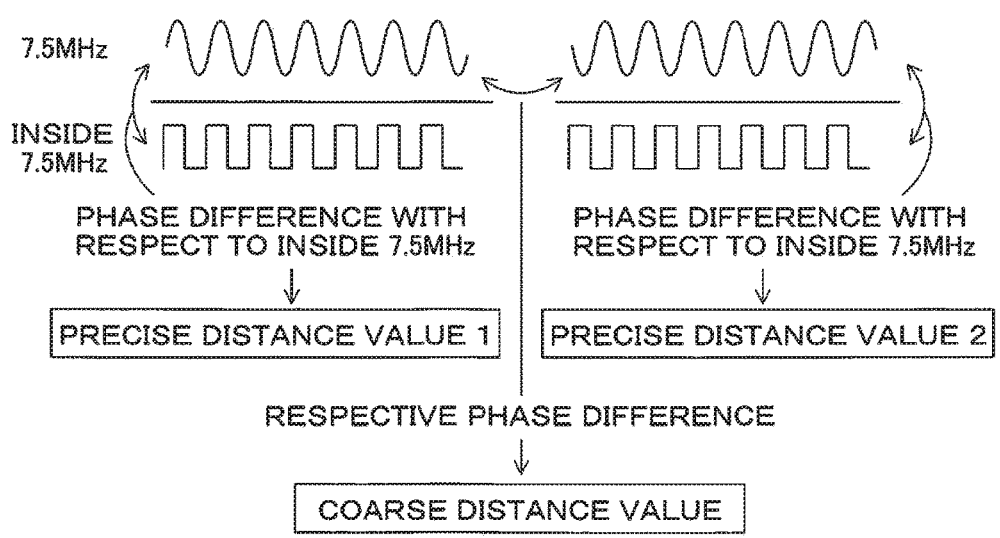

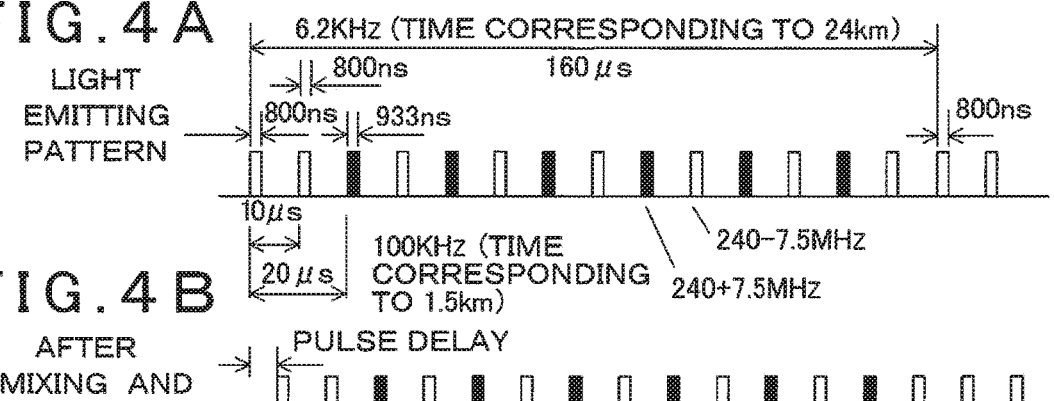
FIG.4A LIGHT EMITTING PATTERN
FIG.4B AFTER MIXING AND FILTERING
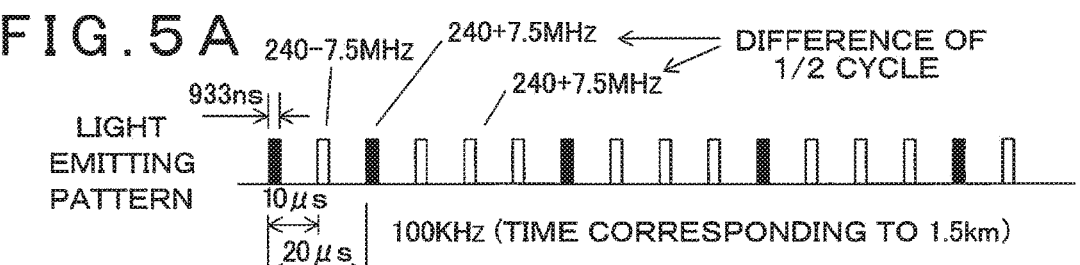
FIG.5A LIGHT EMITTING PATTERN
FIG.5B PHOTO-DETECTION SIGNAL
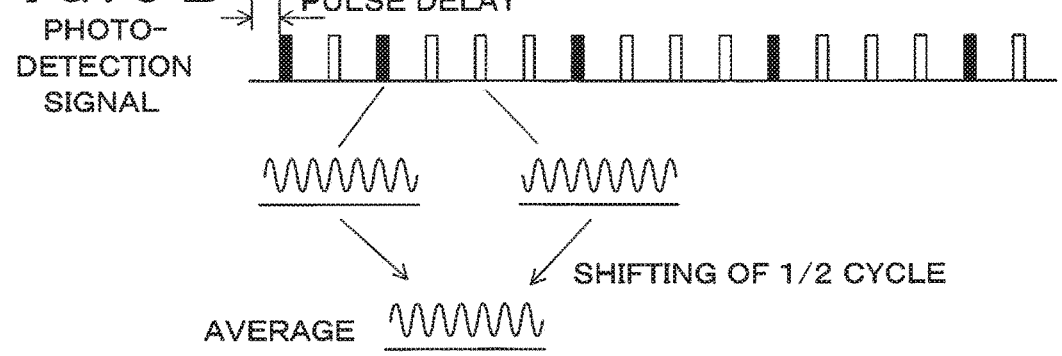
SIMILAR FOR 240MHz-7.5MHz

ELECTRO-OPTICAL DISTANCE METER

BACKGROUND OF THE INVENTION

The present invention relates to an electro-optical distance meter, which projects a modulated measuring light to an object to be measured, receives a reflected measuring light from the object to be measured and measures a distance to the object to be measured by a phase difference between the measuring light and the reflected measuring light.

In the electro-optical distance meter which perform a distance measurement by detecting the phase difference between the measuring light and the reflected measuring light, a distance as measurable and a measurement accuracy are determined by a modulated frequency. For this reason, in order to make measuring from a near distance to a long distance possible, it is necessary to project a distance measuring light with a plurality of modulated frequencies.

For instance, in a case where a modulated frequency of 30 MHz and a modulated frequency of 300 KHz are used, a distance up to 5 m and a distance up to 500 m can be measured by each frequency respectively. In order to measure a distance longer than the above, further more frequencies are necessary. Conventionally, in order to measure a phase of a high-frequency wave, a heterodyne method is used, and phase measurement has been performed after decreasing the frequency. For instance, for the phase measurement of 30 MHz and 300 KHz, frequencies of 30 MHz–30 KHz and 300 KHz–30 KHz are generated, and phase measurement has been performed by the difference frequency of 30 KHz. When the frequency of 300 KHz–30 KHz, as generated at this moment, is used as a third modulated frequency, by obtaining a phase difference against the modulated frequency of 300 KHz, in a pseudo manner, the phase difference becomes equivalent to the phase modulated at 30 KHz, which made distance measurement up to 5 km possible.

In a conventional electro-optical distance meter, since a plurality of frequencies are prepared, distance measuring light is projected per each plurality of frequencies, and distance measurement is performed, there have been problems in that a circuit arrangement becomes complicated and measurement time becomes longer.

SUMMARY OF THE INVENTION

It is an object of the present invention to provide an electro-optical distance meter, by which it is possible to efficiently prepare signals required for measurement and to perform measurement within a short time.

To attain the object as described above, an electro-optical distance meter according to the present invention comprises a light emitting element for emitting a distance measuring light, signal generators for generating two or more proximity frequencies, a modulation signal in which the two or more proximity frequencies are intermitted respectively and converted to pulses with a predetermined width, a projecting optical system for sequentially switching over and projecting intermittent modulated distance measuring light as converted to pulses with predetermined width by the modulation signal, a photodetection unit for receiving a reflected distance measuring light from an object to be measured and producing an intermittent photodetection signal with a predetermined pulse width, a reference signal generator for issuing reference frequency signals having a difference of a predetermined frequency respectively, a frequency converting unit for performing frequency conversion by mixing the intermittent photodetection signals from the photodetection unit and the reference frequency signals, corresponding to each intermittent frequency signals respectively and obtaining intermittent conversion signals with a pulse width, and an arithmetic control unit, wherein the pulse width of the intermittent photodetection signal is set up so as to be longer in a time duration than a period of the intermittent conversion signal, and in a case where the object to be measured is a moving object, the period of the intermittent photodetection signal is set to such speed that a phase change of the intermittent conversion signal due to moving of the moving object can be negligible, wherein the arithmetic control unit is configured so as to calculate a precise measurement distance value by obtaining the phase of the intermittent photodetection signal with respect to the two or more proximity frequencies, to calculate a coarse measurement distance value by obtaining a phase difference between the intermittent conversion signals, and to determine a distance by combining the coarse measurement distance value and the precise measurement distance value.

Further, in the electro-optical distance meter according to the present invention, the arithmetic control unit generates the intermittent modulated distance measuring light as an intermittent pattern to go one round in a predetermined number of intermittence, integrates the intermittent conversion signal by two or more times per each intermittent pattern, specifies the two or more proximity frequencies according to an intermittent width and an intermittent cycle of an integrated waveform as obtained, obtains an average phase of each of the intermittent conversion signals, obtains the precise measurement distance value from the average phase, obtains the coarse measurement distance value from the average phase difference of each of the mutual intermittent conversion signals, and determines a distance to the object to be measured according to the precise measurement distance value and the coarse measurement distance value.

Further, in the electro-optical distance meter according to the present invention, among the two or more proximity frequencies, the frequencies of intermittent conversion signals corresponding to at least two proximity frequencies are the same.

Further, in the electro-optical distance meter according to the present invention, the arithmetic control unit performs distance measurement at a delay time of a photodetection pulse of the intermittent modulated distance measuring light.

Further, in the electro-optical distance meter according to the present invention, the arithmetic control unit produces an abnormal signal in a case where the difference between the precise measurement distance value and the coarse measurement distance value obtained from the two or more proximity frequencies is not within a predetermined value.

Furthermore, in the electro-optical distance meter according to the present invention, an intermittent switch-over of the two or more proximity frequencies is performed by deviating a predetermined cycle per each frequency, and the intermittent conversion signal as frequency converted performs a phase measurement after deviating a predetermined cycle.

According to the present invention, the electro-optical distance meter comprises a light emitting element for emitting a distance measuring light, signal generators for generating two or more proximity frequencies, a modulation signal in which the two or more proximity frequencies are intermitted respectively and converted to pulses with a predetermined width, a projecting optical system for sequentially switching over and projecting intermittent modulated distance measuring light as converted to pulses with predetermined width by the modulation signal, a photodetection unit for receiving a reflected distance measuring light from an object to be measured and producing an intermittent photodetection signal with a predetermined pulse width, a reference signal generator for issuing reference frequency signals having a difference of a predetermined frequency respectively, a frequency converting unit for performing frequency conversion by mixing the intermittent photodetection signals from the photodetection unit and the reference frequency signals, corresponding to each intermittent frequency signals respectively and obtaining intermittent conversion signals with a pulse width, and an arithmetic control unit, wherein the pulse width of the intermittent photodetection signal is set up so as to be longer in a time duration than a period of the intermittent conversion signal, and in a case where the object to be measured is a moving object, the period of the intermittent photodetection signal is set to such speed that a phase change of the intermittent conversion signal due to moving of the moving object can be negligible, wherein the arithmetic control unit is configured so as to calculate a precise measurement distance value by obtaining the phase of the intermittent photodetection signal with respect to the two or more proximity frequencies, to calculate a coarse measurement distance value by obtaining a phase difference between the intermittent conversion signals, and to determine a distance by combining the coarse measurement distance value and the precise measurement distance value. As a result, all of the modulated frequencies are used for a precise measurement and a coarse measurement, a measurement efficiency is high, and a measurement duration is shortened. Further, by setting the distance measuring light as an intermittent light, a time alone, when light output is modulated, can be concentrated on, a peak power can be increased, and since a light emitting duration is shortened, S/N ratio is improved and measurement accuracy is increased. Furthermore, distance measurement is possible even when the object to be measured is a moving object.

Further, according to the present invention, in the electro-optical distance meter, the arithmetic control unit generates the intermittent modulated distance measuring light as an intermittent pattern to go one round in a predetermined number of intermittence, integrates the intermittent conversion signal by two or more times per each intermittent pattern, specifies the two or more proximity frequencies according to an intermittent width and an intermittent cycle of an integrated waveform as obtained, obtains an average phase of each of the intermittent conversion signals, obtains the precise measurement distance value from the average phase, obtains the coarse measurement distance value from the average phase difference of each of the mutual intermittent conversion signals, and determines a distance to the object to be measured according to the precise measurement distance value and the coarse measurement distance value. As a result, the number of intermittence can be set up adequately, corresponding to the measurement accuracy as required.

Further, according to the present invention, in the electro-optical distance meter, among the two or more proximity frequencies, the frequencies of intermittent conversion signals corresponding to at least two proximity frequencies are the same. As a result, a constituent element on an electrical circuit may be designed to correspond with a single frequency, and since the electrical circuit is simplified and frequencies are close to each other, a single filter with a low Q would suffice and since the Q is low, influence on a phase deviation of each of the proximity frequencies respectively is decreased, and abnormal measurement caused by deviation between the precise measurement and the coarse measurement hardly occurs.

Further, according to the present invention, in the electro-optical distance meter, the arithmetic control unit performs distance measurement at a delay time of a photodetection pulse of the intermittent modulated distance measuring light. As a result, a long distance measurement is possible, and a modulated frequency required for long distance measurement can be omitted.

Further, according to the present invention, in the electro-optical distance meter, the arithmetic control unit produces an abnormal signal in a case where the difference between the precise measurement distance value and the coarse measurement distance value obtained from the two or more proximity frequencies is not within a predetermined value. As a result, an abnormal measurement value can be eliminated and a reliability of the measurement can be improved.

Furthermore, according to the present invention, in the electro-optical distance meter, an intermittent switch-over of the two or more proximity frequencies is performed by deviating a predetermined cycle per each frequency, and the intermittent conversion signal as frequency converted performs a phase measurement after deviating a predetermined cycle. As a result, the measurement with less error can be attained.

BRIEF DESCRIPTION OF THE DRAWINGS

FIG. 3A is an explanatory drawing to show a condition where a distance measuring light is pulsed, FIG. 3B is an explanatory drawing to show a photodetection signal, FIG. 3C is an explanatory drawing to show a light emitting pattern, FIG. 3D is a drawing to show a light emitting pattern after a signal conversion, and FIG. 3E is an explanatory drawing shown as enlarged, of a pulse modulation light after passing through a low-pass filter, and further, a drawing to show a photodetection signal and an internal signal after an A/D conversion.

FIG. 4A and FIG. 4B are explanatory drawings of distance measurement by delay time measurement, where FIG. 4A is an explanatory drawing of a light emitting pattern, and FIG. 4B is an explanatory drawing to show a photodetection signal.

FIG. 5A and FIG. 5B are drawings where phase change is carried out per each proximity frequency, where FIG. 5A is a drawing to show a light emitting pattern, and FIG. 5B is an explanatory drawing to show a photodetection signal.

DETAILED DESCRIPTION OF THE PREFERRED EMBODIMENTS

A description will be given below on an embodiment of the present invention by referring to the attached drawings.

First, referring to FIG. 1, a description will be given on a distance measuring optical system 1 of an electro-optical distance meter according to an embodiment of the present invention.

Figure 1:
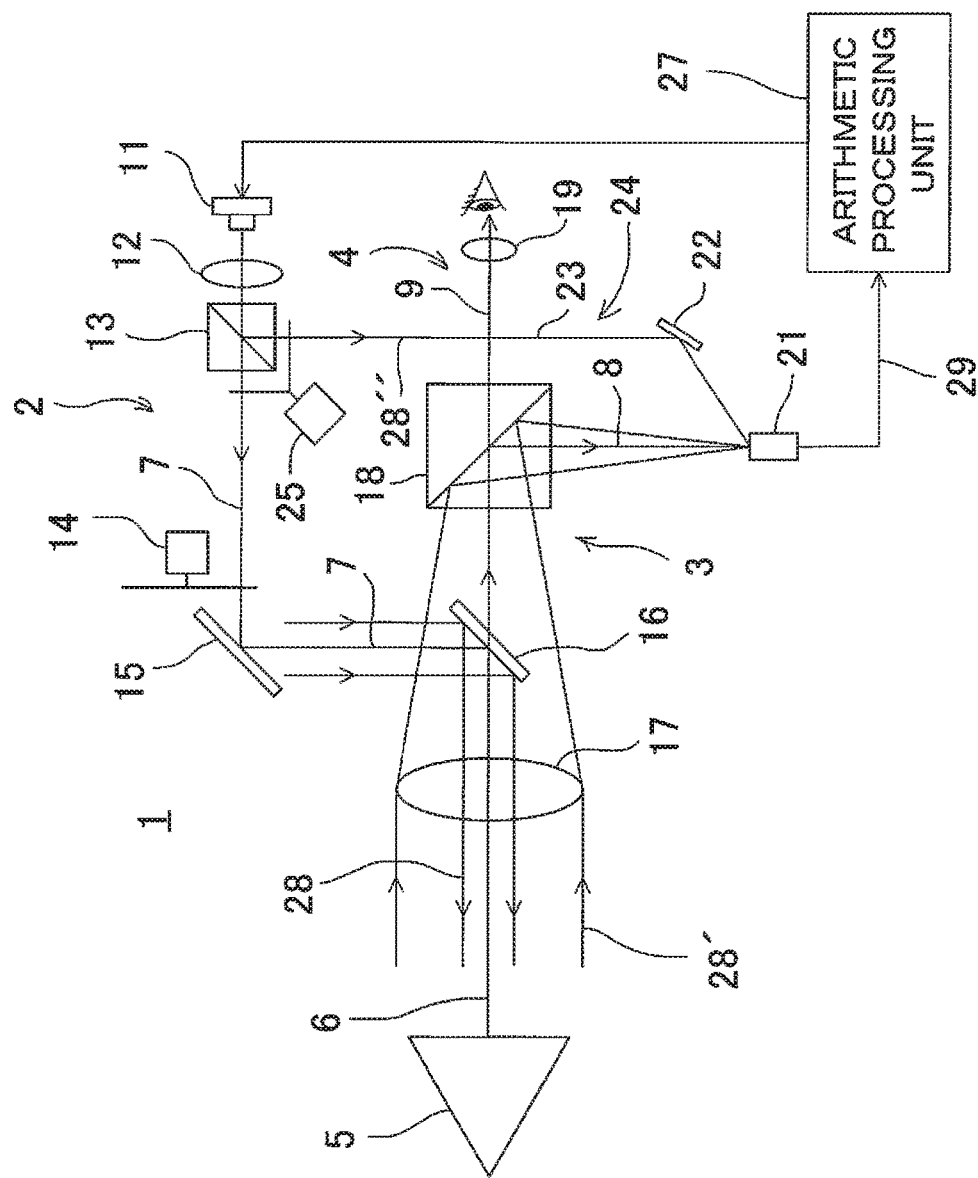
FIG. 1 is a schematical drawing of an optical system of an electro-optical distance meter according to the present embodiment.

In FIG. 1, the distance measuring optical system 1 comprises a projecting optical system 2, a photodetecting optical system 3 and a sighting optical system 4. Further, FIG. 1 shows that an object to be measured 5 is a prism as a retro-reflector.

The distance measuring optical system 1 has a distance measuring optical axis 6 directed to the object to be measured 5 and the projecting optical system 2 has a projecting optical axis 7, the photodetecting optical system 3 has a photodetection optical axis 8, and the sighting optical system 4 has a sighting optical axis 9.

Along the projecting optical axis 7, a light emitting element 11, a condenser lens 12, a half mirror 13 and a light quantity adjuster 14 are arranged. Further, along the projecting optical axis 7, deflection mirrors 15 and 16 are arranged and the projecting optical axis 7 is deflected by the deflection mirrors 15 and 16 so as to coincide with the distance measuring optical axis 6.

The light emitting element 11 is a laser diode, for instance, and emits an invisible light as a distance measuring light.

Along the distance measuring optical axis 6, an objective lens 17 and a dichroic mirror 18 are provided. The dichroic mirror 18 is adapted so as to allow a visible light to pass through and reflect a distance measuring light. A part where the distance measuring optical axis 6 passes through the dichroic mirror 18 is the sighting optical axis 9, and an ocular lens 19 is provided along the sighting optical axis 9.

The objective lens 17, the dichroic mirror 18, the ocular lens 19, etc. make up together the sighting optical system 4.

The condenser lens 12, the half mirror 13, the light quantity adjuster 14, the deflection mirrors 15 and 16, the objective lens 17, etc. make up together the projecting optical system 2.

A part where the distance measuring optical axis 6 is reflected by the dichroic mirror 18 is the photodetection optical axis 8, and a photodetection element 21 is provided along the photodetection optical axis 8.

The objective lens 17, the dichroic mirror 18, etc. make up together the photodetecting optical system 3.

A reflection optical axis of the half mirror 13 is guided to the photodetection element 21 as an internal reference optical axis 23 via a reflection mirror 22. The half mirror 13 and the reflection mirror 22 make up together an internal reference optical system 24.

An optical path switching unit 25 is spanned between the projecting optical axis 7 and the internal reference optical axis 23. The optical path switching unit 25 alternatively shuts off or opens the projecting optical axis 7 or the internal reference optical axis 23. The optical path switching unit 25 is configured so as to select that a distance measuring light passing through the half mirror 13 is projected or that one part of the distance measuring light as reflected by the half mirror 13 is projected to the internal reference optical system 24.

The light emitting element 11 and the photodetection element 21 are electrically connected to the arithmetic processing unit 27 respectively.

A description will be given below on an operation of the distance measuring optical system 1.

A distance measuring light 28 as modulated is emitted from the light emitting element 11. The distance measuring light 28 as turned to a parallel luminous flux by the condenser lens 12 is projected toward the object to be measured 5 by passing through a central part of the objective lens 17 after the light quantity is adjusted by the light quantity adjuster 14.

The distance measuring light as reflected by the object to be measured 5 enters the objective lens 17 as a reflected distance measuring light 28', is condensed by the objective lens 17 and is reflected by the dichroic mirror 18 and enters the photodetection element 21. The reflected distance measuring light 28' is received by the photodetection element 21 and the photodetection element 21 produces an intermittent photodetection signal 29 (to be described later).

After being emitted by the light emitting element 11, a part of the distance measuring light 28 (an internal reference light 28") is reflected by the half mirror 13. When the internal reference optical axis 23 is opened due to an optical path switch-over by the optical path switching unit 25, the internal reference light 28" enters the photodetection element 21. The photodetection element 21 produces a photodetection signal of the internal reference light 28".

A visible light, which enters the dichroic mirror 18 via the objective lens 17, passes through the dichroic mirror 18 and is condensed by the ocular lens 19. A surveying operator can sight the object to be measured 5 via the ocular lens 19.

The arithmetic processing unit 27 drives the light emitting element 11 and makes the light emitting element 11 to emit a modulated light. Further, the arithmetic processing unit 27 determines a distance to the object to be measured 5 based on an intermittent photodetection signal 29 of the reflected distance measuring light 28' as inputted from the photodetection element 21, and determines an optical path length of the internal reference optical system 24 based on an intermittent photodetection signal 29 of the internal reference light 28". A final measurement value is obtained as a difference between a measurement result based on the reflected distance measuring light 28' and a measurement result of the internal reference light 28". By obtaining the difference between the measurement result of the reflected distance measuring light 28' and the measurement result of the internal reference light 28", an influence due to drifting of the electric circuit can be eliminated.

Next, by referring to FIG. 2, a description will be given on the arithmetic processing unit 27.

Figure 2:
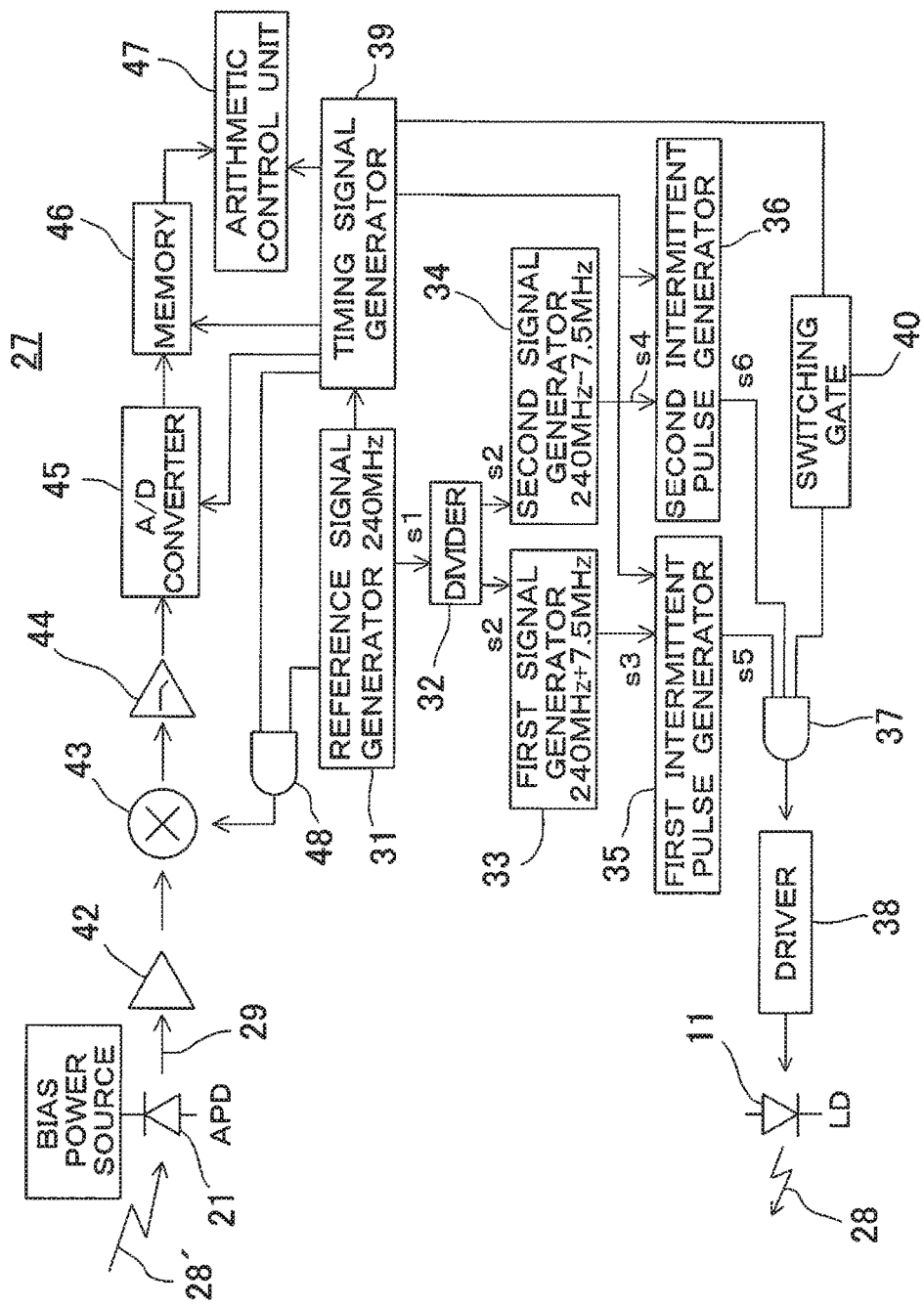
FIG. 2 is a schematical drawing of a measuring circuit of the electro-optical distance meter according to the present embodiment.

In FIG. 2, what are equivalent to components as shown in FIG. 1 are referred by the same symbol, and detailed description thereof will not be given here.

A reference signal generator 31 generates a reference frequency signal s1 of a predetermined frequency. The numerical values as shown below can be adequately changed, depending on a measurement distance and a measurement accuracy. For instance, in the description as given below, 240 MHz is regarded as a reference frequency.

With respect to the reference frequency signal s1 as issued from the reference signal generator 31, 240 MHz is divided to 1/32 by a divider 32, and a divided frequency signal s2 of 7.5 MHz is generated. The divided frequency signal s2 is inputted to a first signal generator 33 and a second signal generator 34.

In the first signal generator 33, a first modulation signal s3 of 240 MHz+7.5 MHz is generated by the divided frequency signal s2 and the reference frequency signal s1 and is outputted to a first intermittent pulse generator 35. Further, in the second signal generator 34, a second modulation signal s4 of 240 MHz−7.5 MHz is generated by the divided frequency signal s2 and the reference frequency signal s1 and is outputted to a second intermittent pulse generator 36.

By the first signal generator 33 and the second signal generator 34, two modulation signals having close frequencies, i.e. 240 MHz+7.5 MHz (s3) and 240 MHz−7.5 MHz (s4) are generated.

In the first intermittent pulse generator 35, the first modulation signal s3, which is a continuous signal, is converted to an intermittent signal as issued per predetermined time interval by a predetermined time duration. That is, the first modulation signal s3 of continuous signal is changed to a pulse signal. A first pulse modulation signal s5 as pulsed is inputted from the first intermittent pulse generator 35 to an AND circuit 37.

Therefore, in the pulses of the first pulse modulation signal s5, the frequency of 240 MHz+7.5 MHz is included, and the pulse is constituted of the frequency of 240 MHz+ 7.5 MHz.

Similarly, in the second intermittent pulse generator 36, the second modulation signal s4, which is a continuous signal, is converted to an intermittent signal, which is issued per predetermined time interval by a predetermined time duration and is changed to a pulse signal. A second pulse modulation signal s6 as pulsed is inputted from the second intermittent pulse generator 36 to the AND circuit 37. Also, regarding a pulse of the second pulse modulation signal s6, similarly to the first pulse modulation signal s5, the frequency of 240 MHz−7.5 MHz is included, and the pulse is constituted of the frequency of 240 MHz−7.5 MHz.

The reference frequency signal s1 generated by the reference signal generator 31 is also inputted to a timing signal generator 39. The timing signal generator 39 generates various types of timing signals based on the reference frequency signal s1.

The timing signal generator 39 sends timing signals to the first intermittent pulse generator 35 and the second intermittent pulse generator 36 and controls in such a manner that the first pulse modulation signal s5 and the second pulse modulation signal s6 from the second intermittent pulse generator 36 are outputted, alternately and at a predetermined time interval.

Further, the timing signal from the timing signal generator 39 is inputted to a switching gate 40. A switching signal is inputted to the AND gate 37 from the switching gate 40.

In response to the switching signal from the switching gate 40, the AND circuit 37 outputs the first pulse modulation signal s5 and the second pulse modulation signal s6 to a driver 38 alternately.

As shown in FIG. 3A, the driver 38 drives the light emitting element 11 based on the first pulse modulation signal s5 and the second pulse modulation signal s6. The driver 38 makes the light emitting element 11 to emit the distance measuring light modulated at 240 MHz+7.5 MHz and the distance measuring light modulated at 240 MHz−7.5 MHz alternately, at a predetermined time duration and at a predetermined time interval respectively (see FIG. 3C).

The light emitting element 11 emits a distance measuring light 28 intermittently and the distance measuring light 28 becomes a pulsed light. Further, pulsed lights emitted alternately is constituted of a modulation light of 240 MHz+7.5 MHz and a modulation light of 240 MHz−7.5 MHz respectively (hereinafter referred as a pulse modulation light).

FIG. 3A and FIG. 3C each shows a condition where a modulation light of 240 MHz+7.5 MHz and a modulation light of 240 MHz−7.5 MHz are emitted alternately. Further, in the present embodiment, a pulse width is set to 933 ns. Here, in a case where an object to be measured is a moving object, a switching timing of the modulation light of 240 MHz+7.5 MHz and the modulation light of 240 MHz−7.5 MHz are set up so as to switch over at a higher speed compared with the moving speed and the moving of the object to be measured does not exert influence on the measurement results.

Here, in a case where the modulation light is intermitted, a pulse width is set up so as to be longer than one cycle of a difference frequency. Further, a speed of a cycle of intermittence (a pulse generating cycle) is set in such a manner that a phase change of a difference frequency signal due to the moving of the moving object can be neglected.

Further, as the distance measuring light 28 is emitted intermittently, i.e. by pulse emitting, a light emitting duty ratio of the light emitting element (a laser diode (LD)) 11 is decreased. Since a peak value can be increased by the decreasing amount of the light emitting duty ratio, a light intensity of the distance measuring light can be increased without impairing the safety with respect to an eye, and a long distance measurement becomes possible. It is to be noted that the predetermined time duration and the predetermined time interval can be adequately selected depending on a measuring condition.

The distance measuring light 28 is emitted towards the object to be measured 5, reflected by the object to be measured 5 and is received by the photodetection element 21 via the photodetecting optical system 3. The photodetection element 21 produces an intermittent photodetection signal 29. As the photodetection element to be used, a photodiode, and further, an avalanche photodiode (APD) is used, for instance.

Further, an optical path is switched over by the optical path switching unit 25 and one part of the distance measuring light 28 is received by the photodetection element 21 as an internal reference light 28″ via the internal reference optical system 24. It is to be noted that since a processing of the photodetection signal when the reflected distance measuring light 28′ is received is similar to the processing of the photodetection signal for the internal reference light 28″, a description will be given below on the processing of the photodetection signal of the reflected distance measuring light 28′ The photodetection element 21 alternately receives a pulse modulation light of 240 MHz+7.5 MHz and a pulse modulation light of 240 MHz−7.5 MHz as a reflected distance measuring light 28′. Therefore, the photodetection signal of the photodetection element 21 becomes a pulse output and becomes an intermittent photodetection signal 29 having frequencies of 240 MHz+7.5 MHz and 240 MHz−7.5 MHz inside the pulse.

FIG. 3B shows a generating condition of the photodetection signal. In the photodetection signal, a delay time (pulse delay) occurs, corresponding to the distance between light emitting pulses.

The photodetection signal is amplified by an amplifier 42 and the signals as amplified are inputted to a mixing circuit 43. To the mixing circuit 43, a reference frequency signal s1 of 240 MHz is inputted from the reference signal generator 31 via an AND circuit 48. The timing of the inputting of the reference frequency signal s1 is controlled by the timing signal from the timing signal generator 39 so as to perform mixing with the photodetection signal (intermittent signal) of the pulse modulation light of 240 MHz+7.5 MHz and the photodetection signal (intermittent signal) of the pulse modulation light of 240 MHz−7.5 MHz.

Frequency conversion is performed by mixing of the photodetection signal of the pulse modulation light of 240 MHz+7.5 MHz, the photodetection signal of the pulse modulation light of 240 MHz−7.5 MHz and the reference frequency signal s1, and the frequency of ±7.5 MHz and added frequency 240 MHz+240 MHz+7.5 MHz and frequency 240 MHz+240 MHz−7.5 MHz are obtained. Further, by passing through the low-pass filter 44, high frequency components are removed and a difference frequency of ±7.5 MHz remains. The difference frequency signal of ±7.5 MHz is a difference frequency signal (intermittent conversion signal) in a pulsed condition since the difference frequency signal of ±7.5 MHz corresponds to a pulse modulation light of 240 MHz+7.5 MHz and a pulse modulation light of 240 MHz−7.5 MHz.

Further, in the two difference frequencies, one is a difference frequency signal of 7.5 MHz where a phase advances in terms of time and the other one is a difference frequency signal of 7.5 MHz where a phase retreats in terms of time (see FIG. 3E). Therefore, a phase deviation (phase difference) corresponding to a distance (time) occurs between both difference frequencies.

Here, the reference signal generator 31, the timing signal generator 39, the AND circuit 48, the mixing circuit 43 and the like function as a frequency conversion unit.

Each of the difference frequencies passes through the low-pass filter 44, high frequency components are removed and each of the difference frequencies is inputted to an A/D converter 45. A range of the low-pass filter 44 is set up to about 10 MHz, which is sufficient for the difference frequency of 7.5 MHz. After the conversion by the A/D converter 45, each of the difference frequencies is stored in a memory 46, which serve as a storing means.

FIG. 3E shows that in a mixing in the mixing circuit 43, signals included in the pulses are signals with the difference frequency of 7.5 MHz.

The signal stored in the memory 46 is read by an arithmetic control unit 47 for the purpose of calculating the distance and a phase difference is calculated per each difference frequency signal. That is, a phase is obtained per each frequency of 240 MHz+7.5 MHz and 240 MHz−7.5 MHz included in each pulse signal, and further, a phase is obtained per each waveform of one cycle, and respectively used for precise measurement. Further, phase differences are detected per each difference frequency signal of two types and per difference frequencies of one cycle, a phase difference between both difference frequencies is obtained, and the phase difference is used for coarse measurement. The arithmetic control unit 47 calculates a distance based on a light velocity by using the phase difference for precise measurement and the phase difference for coarse measurement (see FIG. 3E).

Further, by adding and averaging of both difference frequencies, i.e. the difference frequency of 7.5 MHz and the difference frequency of −7.5 MHz, a phase waveform without a phase deviation at a starting point can be obtained for the waveforms within the pulse. Further, a phase measurement with a high accuracy becomes possible by performing adding and averaging, corresponding with each of the proximity frequencies respectively.

The measurement distances which can be obtained from the phase of each of the frequencies of 240 MHz+7.5 MHz and 240 MHz−7.5 MHz are 60.6 cm and 64.5 cm respectively, at maximum, and a measurement of a short distance with high accuracy is possible. Further, since a measurement time interval is very short, a distance measurement of a moving object is also possible.

Further, the measurement distance which can be obtained from the phase difference between the difference frequencies of ±7.5 MHz is 10 m at maximum, and a measurement of a medium distance (coarse distance measurement) is possible. Therefore, by combining the distance measurement by phase detections of 240 MHz+7.5 MHz and 240 MHz−7.5 MHz and the distance measurement by phase detections between the difference frequencies of ±7.5 MHz, a distance measurement with high accuracy from a short distance to a medium distance becomes possible.

Further, regarding the combination of distance measurements, a distance of a minimal unit or less of a medium distance measurement (coarse measurement) is compensated by precise measurement. Further, in a case where the difference between a medium distance measurement value (coarse distance measurement value) and a precise distance measurement value is not within a predetermined value, a signal may be issued to notify that the measurement is abnormal. This makes it possible to judge that the measured value is abnormal and contributes to an improvement of reliability of the measurement.

Further, the circuit for calculating the phase and an arithmetic circuit for calculating a distance based on the phase as calculated, can be a common processing circuit, since frequencies of 240 MHz+7.5 MHz and 240 MHz−7.5 MHz are close to each other, and the difference frequencies of ±7.5 MHz are the same difference frequency. Therefore, a circuit arrangement of the arithmetic control unit 47 become simplified.

Further, measurement accuracies are frequencies 240 MHz+7.5 MHz and 240 MHz−7.5 MHz as close to each other, which are approximately the same, and distance measurement results as measured by both frequencies can be used as the data for average processing. Thus, many distance measurement results can be averaged in lesser circuit arrangements, and this contributes to the improvement of the measurement accuracy.

As described above, a distance measurement by the phase and the phase difference is executed per each frequency wave, and since the measurement results as obtained per each frequency wave is averaged, a number of times of measurements are determined according to the number of frequency waves included within the pulse modulation light. Therefore, in order to improve the accuracy of the measured value by increasing the average number of times, it would suffice if the number of times of measurements are increased by widening the pulse width. A determination of the pulse width and the pulse interval can be changed by giving consideration on the measurement accuracy.

Next, a description will be given on a case where a long distance measurement is performed.

In the long distance measurement, the pulse modulation light is processed as a pulsed light and a distance measurement is performed based on the time of reciprocal running (delay time) of the pulsed light (TOF: Time of Flight).

As shown in FIG. 4A, a pulse width of the pulse modulation light is changed per each predetermined time interval. For instance, it is supposed that a normal pulse width is 933 ns, the pulse interval is 20 μs and the pulse width is 800 ns per 160 μs interval, i.e. per each pulse modulation light. 160 μs is 6.2 KHz and is equivalent to a pulse delay time of 24 km. The pulse width may be set as narrower or wider, but is configured so as to be set as it can be identifiable from other pulses, and the pulse as identifiable is set up as a reference pulsed light.

Thus, by detecting the reference pulsed light, an intermittent pattern which go one round per 8 pulses (per 8 intermittent numbers) is prepared. It is needless to say that the number of intermittence is set up adequately.

It is to be noted that since pulse modulation lights of 240 MHz+7.5 MHz and 240 MHz−7.5 MHz are alternately emitted, the pulse interval itself is 10 μs.

By detecting a delay time of the photodetection signal of the reference pulsed light with the pulse width of 800 ns, it becomes possible to measure up to 24 km in round trip (see FIG. 4B). Since the light emission interval of the reference pulsed light can be set up arbitrarily, it is possible to correspond with a maximum measurement distance as required and can be set up adequately.

Further, by forming an intermittent pattern, integration is performed a plurality of times per intermittent pattern, and an integrated waveform is obtained. From an intermittent width and an intermittent cycle of the integrated waveform as obtained, a plurality of proximity frequencies are specified. Average phases of intermittent conversion signals of the respective proximity frequencies are obtained. The precise measurement value may be obtained from the average phase, the coarse measurement distance value may be obtained from the average phase difference, and the distance of the object to be measured may be measured from the precise measurement distance value and the coarse measurement distance value.

In the embodiment as described above, two proximity frequencies are generated, while it may be so arranged that three or more proximity frequencies are generated or it may be so arranged that two sets or more proximity frequencies may be generated.

FIG. 5A shows a light emitting pattern where the phase is shifted by ½ cycle per 240 MHz+7.5 MHz and 240 MHz−7.5 MHz. Further, by adding and averaging the photodetection signal shifted by ½ cycle per 240 MHz+7.5 MHz and 240 MH−7.5 MHz, a phase measurement with high accuracy becomes possible (see FIG. 5B).

As described above, according to the present invention, all of the modulated frequencies are used for precise measurement and coarse measurement, a measurement efficiency is high, and a measurement time is shortened. Further, by using an intermittent light as a distance measuring light, a light output can be concentrated to only the time of modulation, a peak power can be increased, and since a light emitting duration can be shortened, an S/N ratio is improved and the measurement accuracy is improved.

Further, since it is so arranged that distance measurement is performed by distance measuring lights of two modulated frequencies close to each other, it is possible to perform signal processing and distance calculation by a common processing circuit, and the circuit arrangement is simplified.

Further, since a continuous modulation wave is converted to an intermittent signal and the intermittent signal is emitted in form of pulses, the peak value of the distance measuring light as projected can be increased, a light receiving amount is increased, and the measurement accuracy improves and a long distance measurement becomes possible.

Further, by emitting by pulse emission, since a long distance measurement can be performed based on the time of round trip of the pulsed light, and the light emission interval of the pulsed light, subjected to distance measurement, can be arbitrarily set up, the maximum measurement distance can be easily changed depending on a measuring condition.

In the embodiment as described above, two proximity frequencies are generated, while it may be so arranged that three or more proximity frequencies are generated or it may be so arranged that two sets or more proximity frequencies may be generated.

Further, in a case where the object to be measured is a moving object, since a period of the intermittent signal is set to a speed in which a phase change of the intermittent conversion signal due to the moving of the moving object can be neglected, a distance measurement becomes possible even when the object to be measured is a moving object.

Further, the arithmetic control unit generates an intermittent modulated distance measuring light as an intermittent pattern, which goes one round in a predetermined number of intermittence. The intermittent conversion signal is integrated by a plurality of times per each intermittent pattern and specifies a plurality of proximity frequencies according to an intermittent width and an intermittent cycle of an integrated waveform as obtained. An average phase of each of intermittent conversion signals of the proximity frequencies is obtained respectively, a precise measurement distance value is obtained from the average phase and a coarse measurement distance value is obtained from the average phase difference of each of the mutual intermittent conversion signals. Then, according to the precise measurement distance value and the coarse measurement distance value, a distance to the object to be measured is determined. Accordingly, the number of intermittence can be set up adequately, corresponding to the measurement accuracy as required.

Further, it would suffice if a component element on an electric circuit corresponds to one frequency, and the circuit arrangement becomes simple. Further, a single filter having a low Q will suffice since the frequencies are close to each other. Since the Q is low, influences against respective phase deviations of the proximity frequencies are decreased, and an abnormal measurement is unlikely to occur because of a deviation between a precise measurement and a coarse measurement.

Further, since a distance measurement is performed according to a delay time of a photodetection pulse of the intermittent modulated distance measuring light, a long distance measurement is possible, and this makes it possible to eliminate the use of a modulated frequency, which is required for long distance measurement. Further, since the light emission interval of a pulsed light can be set up arbitrarily, a maximum measurement distance can be easily changed, depending on a measuring condition.

Further, in a case where the difference between the precise measurement distance value and the coarse measurement distance value as obtained from a plurality of proximity frequencies are not within the predetermined value, an abnormal signal is produced. As a result, it is possible to eliminate an abnormal measurement value, and this contributes to the improvement of the reliability of the measurement.

Further, the intermittent switch-over of a plurality of proximity frequencies is performed for each frequency by deviating a predetermined period. Since with respect to the intermittent conversion signal as frequency converted, a phase measurement is performed after deviating by the predetermined period, it is possible to perform the measurement with less error.

The invention claimed is:

1. An electro-optical distance meter comprising; a light emitting element for emitting a distance measuring light, signal generators for generating two or more proximity frequencies, intermittent pulse generators for generating a modulation signal in which said two or more proximity frequencies are intermitted respectively and converted to pulses with a predetermined width, a projecting optical system for driving said light emitting element and sequentially switching over and projecting intermittent modulated distance measuring light as converted to pulses with predetermined width by said modulation signal, a photodetection unit for receiving a reflected distance measuring light from an object to be measured and producing an intermittent photodetection signal with a predetermined pulse width, a reference signal generator for issuing reference frequency signals having a difference of a predetermined frequency respectively, a frequency converting unit for performing frequency conversion by mixing said intermittent photodetection signals from said photodetection unit and said reference frequency signals, corresponding to each intermittent frequency signals respectively and obtaining intermittent conversion signals with a pulse width, and an arithmetic control unit, wherein the pulse width of said intermittent photodetection signal is set up so as to be longer in a time duration than a period of said intermittent conversion signal, and in a case where said object to be measured is a moving object, an intermittent cycle of said intermittent photodetection signal is set to such speed that a phase change of said intermittent conversion signal due to moving of said moving object can be negligible, wherein said arithmetic control unit is configured so as to calculate a precise measurement distance value by obtaining the phase of said intermittent photodetection signal with respect to said two or more proximity frequencies, to calculate a coarse measurement distance value by obtaining a phase difference between said intermittent conversion signals, and to determine a distance by combining said coarse measurement distance value and said precise measurement distance value.

2. The electro-optical distance meter according to claim 1, wherein said arithmetic control unit generates said intermittent modulated distance measuring light as an intermittent pattern to go one round in a predetermined number of intermittence, integrates said intermittent conversion signal by two or more times per each intermittent pattern, specifies said two or more proximity frequencies according to an intermittent width and an intermittent cycle of an integrated waveform as obtained, obtains an average phase of each of said intermittent conversion signals, obtains said precise measurement distance value from the average phase, obtains said coarse measurement distance value from the average phase difference of each of said mutual intermittent conversion signals, and determines a distance to said object to be measured according to said precise measurement distance value and said coarse measurement distance value.

3. The electro-optical distance meter according to claim 1, wherein among said two or more proximity frequencies, the frequencies of intermittent conversion signals corresponding to at least two proximity frequencies are the same.

4. The electro-optical distance meter according to claim 1, wherein said arithmetic control unit performs distance measurement at a delay time of a photodetection pulse of said intermittent modulated distance measuring light.

5. The electro-optical distance meter according to claim 1, wherein said arithmetic control unit produces an abnormal signal in a case where the difference between said precise measurement distance value and said coarse measurement distance value obtained from said two or more proximity frequencies is not within a predetermined range.

6. The electro-optical distance meter according to claim 1, wherein an intermittent switch-over of said two or more proximity frequencies is performed by deviating a predetermined cycle per each frequency, and said intermittent conversion signal as frequency converted performs a phase measurement after deviating a predetermined cycle.

* * * * *